(12) United States Patent
Pang et al.

(10) Patent No.: US 12,421,839 B2
(45) Date of Patent: Sep. 23, 2025

(54) MULTI-OBJECTIVE OPTIMIZATION ON MODELING AND OPTIMIZING SCALING AND CORROSION IN A WELLBORE

(71) Applicant: Landmark Graphics Corporation, Houston, TX (US)

(72) Inventors: Da Pang, Beijing (CN); Srinath Madasu, Houston, TX (US); Xinli Jia, Sugar Land, TX (US); Keshava Prasad Rangarajan, Sugar Land, TX (US)

(73) Assignee: Landmark Graphics Corporation, Houston, TX (US)

( * ) Notice: Subject to any disclaimer, the term of this patent is extended or adjusted under 35 U.S.C. 154(b) by 1088 days.

(21) Appl. No.: 17/279,969

(22) PCT Filed: Apr. 13, 2020

(86) PCT No.: PCT/US2020/028013
§ 371 (c)(1),
(2) Date: Mar. 25, 2021

(87) PCT Pub. No.: WO2021/211092
PCT Pub. Date: Oct. 21, 2021

(65) Prior Publication Data
US 2022/0112799 A1    Apr. 14, 2022

(51) Int. Cl.
*E21B 41/02*        (2006.01)
*E21B 37/06*        (2006.01)
(Continued)

(52) U.S. Cl.
CPC ............ *E21B 47/006* (2020.05); *E21B 37/06* (2013.01); *E21B 41/02* (2013.01); *E21B 47/07* (2020.05);
(Continued)

(58) Field of Classification Search
CPC ...... E21B 2200/22; E21B 41/02; E21B 49/08; E21B 49/0875; E21B 47/006; E21B 47/06; G05B 13/027; G05B 13/041
See application file for complete search history.

(56) References Cited

U.S. PATENT DOCUMENTS 9,562,844 B2 * 2/2017 Chilukuri ............... G01B 11/14
9,771,795 B2 * 9/2017 Knight ................... G16B 10/00
(Continued)

OTHER PUBLICATIONS

Calle, Paul, "NSGA-II explained!," Oct. 24, 2017, analytics lab @ OU, Available https://oklahomaanalytics.com/data-science-techniques/nsga-ii-explained/ (Year: 2017).*
(Continued)

*Primary Examiner* — Alvin H Tan
(74) *Attorney, Agent, or Firm* — Kilpatrick Townsend & Stockton LLP (57) ABSTRACT

System for optimizing operation of an oil and gas well employs multi-objective Bayesian optimization of wellbore parameters to minimize scaling and corrosion. The system may contain instrumentation for measuring temperature, pressure, at least one production parameter and at least one ion concentration of the fluid in the wellbore. The system may also have a processor for performing a calculation procedure to determine an anticipated corrosion rate ("Vbase") and a scaling index ("Is") reflecting a tendency of scale to form in the wellbore based on the measurements provided by the instrumentation, where Vbase and Is are calculated along the length of the wellbore. Based on a selected set of optimization points taken from the calculations of Vbase and Is, the system may control the alkalinity and flow rate of the fluid based on the multi-objective optimization to simultaneously optimize scaling and corrosion.

20 Claims, 4 Drawing Sheets

(51) Int. Cl.
| | |
|---|---|
| E21B 47/00 | (2012.01) |
| E21B 47/07 | (2012.01) |
| E21B 47/10 | (2012.01) |
| E21B 49/08 | (2006.01) |
| G05B 13/02 | (2006.01) |
| G05B 13/04 | (2006.01) |

(52) U.S. Cl.
CPC .......... *E21B 47/10* (2013.01); *E21B 49/0875* (2020.05); *G05B 13/027* (2013.01); *G05B 13/041* (2013.01); *E21B 2200/20* (2020.05); *E21B 2200/22* (2020.05)

(56) References Cited

U.S. PATENT DOCUMENTS

| | | | | |
|---|---|---|---|---|
| 10,436,765 | B2* | 10/2019 | Roberts | G01N 33/2823 |
| 11,112,280 | B2* | 9/2021 | Lewis | G01D 21/02 |
| 2008/0262737 | A1* | 10/2008 | Thigpen | G01V 1/40 |
| | | | | 702/9 |
| 2009/0151936 | A1 | 6/2009 | Greenaway | |
| 2010/0185401 | A1 | 7/2010 | Hernandez et al. | |
| 2011/0137704 | A1 | 6/2011 | Mitra et al. | |
| 2013/0263667 | A1 | 10/2013 | Volker et al. | |
| 2015/0356210 | A1 | 12/2015 | Hamid et al. | |
| 2021/0246766 | A1* | 8/2021 | Wilson, III | G06F 3/04847 |

OTHER PUBLICATIONS

Khan et al., "Multi-objective bayesian optimization algorithm," Jul. 9, 2002, GECCO'02: Proceedings of the 4th Annual Conference on Genetic and Evolutionary Computation, Available https://dl.acm.org/doi/10.5555/2955491.2955599 (Year: 2002).*
CA Application No. CA3111956, "Office Action", May 20, 2022, 3 pages.
International Search Report and Written Opinion for PCT application No. PCT/US2020/028013 issued on Dec. 21, 2020, 10 pages.
Snoek, Jasper, et al.; "Scalable Bayesian Optimization Using Deep Neural Networks"; Proceedings of the 32nd International Conference on Machine Learning, JMLR: W&CP vol. 37 (arXiv:1502.05700v2 [stat.ML] Lille, France; Jul. 13, 2015; 13 pages.
Berkenkamp, Felix, et al.; "Bayesian Optimization with Safety Constraints: Safe and Automatic Parameter Tuning in Robotics"; Sage Publications (arXiv:1602.4450v2 [cs.RO]); Mar. 2, 2018; 22 pages.
Knudde, Nicolas, et al.; "GPflowOpt: A Bayesian Optimization Library using TensorFlow"; (arXiv:1711.03845v1 [stat.ML]); Nov. 10, 2017; 5 pages.
De Waard, C. and Lotz, U.; "Prediction of CO2 Corrosion of Carbon Steel"; NACE International; Houston, TX; 1993; 18 pages.
Edwards, Mark A. and Cramer Ben; "Top of Line Corrosion—Diagnosis, Root Cause Analysis, and Treatment"; NACE International; Houston, TX; 2000; 11 pages.
Oddo, J.E. and Tomson, M. B.; "The Prediction of Scale and CO2 Corrosion in Oil Field Systems"; NACE International; Houston, TX; 1999; 16 pages.
Oddo, J.E. and Tomson, M.B .; "Simplified Calculation of CaCO3 Saturation at High Temperatures and Pressures in Brine Solutions"; Society of Petroleum Engineers of AIME; Jul. 1982; 8 pages.
Oddo, J.E. and Tomson, M.B .; "Why Scale Forms and How to Predict It"; Society of Petroleum Engineers; SPE Production & Facilities, Feb. 1994; 8 pages.

* cited by examiner

| Inputs | | | |
|---|---|---|---|
| T&P Input | T(F) <br> P(psia) Flow Pressure | Concentration Inputs | calcite <br> barium <br> strontium <br> iron <br> magnesium <br> weak organic acids <br> total alkalinity <br> sulfate <br> chloride |
| Production Inputs | BWPD (bbl./day) <br> BOPD (bbl./day) <br> MMscf <br> API Gravity <br> Production Tubing ID (in) | | |

FIG. 3

| Temp | Pres | Is | Vbase | pH |
|---|---|---|---|---|
| T:263 | P:1390 | Is:0.7305528234231443 | Vbase:0.0 | pH:5.914061348917954 |
| T:247 | P:1215 | Is:0.5663968211063756 | Vbase:0.0 | pH:5.913583536258403 |
| T:242 | P:1157 | Is:0.5175650944909611 | Vbase:0.0 | pH:5.915578736037229 |
| T:232 | P:1049 | Is:0.4196642347843823 | Vbase:0.0 | pH:5.919394786147586 |
| T:221 | P:945 | Is:0.3102524949491330 | Vbase:0.6714109502345169 | pH:5.922059483365745 |
| T:211 | P:844 | Is:0.2174004459374681 | Vbase:1.169998912718581 | pH:5.930497733199734 |
| T:200 | P:747 | Is:0.1140499610101690 | Vbase:1.5327120870157633 | pH:5.938734336473145 |
| T:190 | P:654 | Is:0.0282370740113925 | Vbase:1.4607795148257778 | pH:5.953872223831598 |
| T:179 | P:565 | Is:-0.0663778702677270 | Vbase:1.2329886900044964 | pH:5.970450367714222 |

MULTI-OBJECTIVE OPTIMIZATION ON MODELING AND OPTIMIZING SCALING AND CORROSION IN A WELLBORE

TECHNICAL FIELD

The exemplary embodiments disclosed herein relate generally to systems and methods for controlling scaling and corrosion in a wellbore or oil and gas pipeline, and more specifically to optimizing systems for closed-loop control of scaling and corrosion using machine learning and Bayesian optimization of system parameters.

BACKGROUND

In the oil and gas industry, scaling and corrosion in wellbores and pipelines for transporting oil and gas is a constant issue that must be addressed. In the past it was common to make no effort to control scaling or corrosion until physical evidence of a problem appeared. Remedial actions could then be taken, such as so-called squeezing or injecting acid to reduce scale over time, or even mechanically scraping the scale from the wellbore or pipeline. Such measures are still used to address corrosion and scaling issues when they arise. In more modern operations, various sensors are used to measure the properties of the fluid flowing through the wellbore or other pipeline, as well as the physical properties of the wellbore or pipeline itself that could influence the anticipated corrosion rate or the tendency for scale to form in the wellbore or pipeline. These parameters can include the temperature, flow pressure, rates of production, or concentration of various ions, like calcite, sulfate or chloride, flowing through the system that might influence corrosion rate or scale formation.

Empirical models for determining the tendency for scale to form in a wellbore or pipeline, or for determining the corrosion rate from certain parameters, are known to those of skill in the art. However, these empirical models have been generated primarily based on laboratory tests, which do not always accurately match results in the field, where real-world conditions affect the corrosion and scaling of the wellbore or pipeline in ways that are not always well understood. Further, empirical models alone do not allow for closed-loop control of a system for optimizing the flow of hydrocarbon fluids through a wellbore or pipeline under conditions that minimize the formation of scale or corrosion, especially since these may represent conflicting objectives. In other words, efforts to reduce scale may increase the rate of corrosion, and efforts to decrease the rate of corrosion may actually result in an increase in the tendency for scale to form in the wellbore or pipeline.

Currently, many oil and gas systems simply monitor scale and corrosion in pipelines or wellbores, and many do not even monitor, but simply treat after the fact by squeezing pH altering chemicals into the pipeline or using systems to mechanically scrape scale from the pipeline.

Therefore, there is a need in the art for improvements in optimizing the control of scale and corrosion in a wellbore or other oil and gas pipeline, particularly for methods and apparatus for performing this control in a closed loop fashion.

BRIEF DESCRIPTION OF THE DRAWINGS

For a more complete understanding of the exemplary disclosed embodiments, and for further advantages thereof, reference is now made to the following description taken in conjunction with the accompanying drawings in which.

DESCRIPTION OF EXEMPLARY EMBODIMENTS

The following discussion is presented to enable a person ordinarily skilled in the art to synthesize and use the exemplary disclosed embodiments. Various modifications will be readily apparent to those skilled in the art, and the general principles described herein may be applied to embodiments and applications other than those detailed below without departing from the spirit and scope of the disclosed embodiments as defined herein. Accordingly, the disclosed embodiments are not intended to be limited to the particular embodiments shown, but are to be accorded the widest scope consistent with the principles and features disclosed herein.

Figure 1:
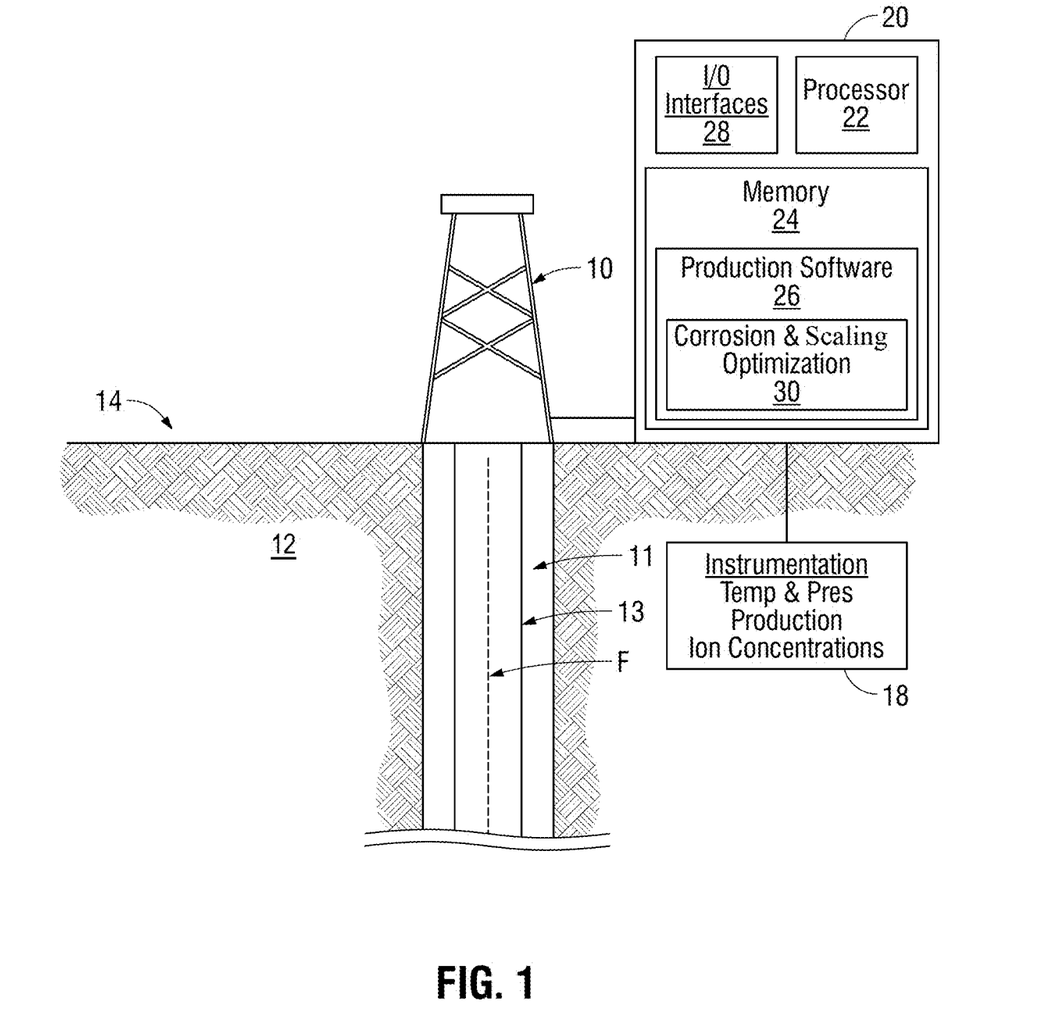
FIG. 1 is a schematic diagram showing a wellsite in which embodiments of the present disclosure may be used.

Referring now to FIG. 1, an exemplary well 10 may operate over a wellbore 11 in a subterranean formation 12 below the surface 14. In the wellbore 11, a production string 13, which may comprise one or more of a cement sheath, a casing, and/or casing packers, may be placed to allow production of subterranean hydrocarbons. Instrumentation 18 mounted at specific locations around the well 10 may be used acquire (e.g., measure) temperature pressure, production parameters, ion concentrations, and the like. The well 10 may be one of many wells in a field covering a particular subterranean hydrocarbon-bearing formation. Further, production from the field may be accomplished using secondary recovery techniques, such as water injection, in which water is injected into the formation from adjacent wells on the surface to drive hydrocarbons toward and up through well 10. It will be understood that the hydrocarbons produced by well 10 are typically a mixture of oil, water, and gas. The amount of each of these components in the produced fluid is referred to as the gas-oil-ratio ("GOR").

The production string 13 in wellbore 11 at well 10 is subject to both scaling and corrosion. Further, the networks of pipelines used to transport hydrocarbons from the well 10 to refineries or other locations are also subject to scaling and corrosion. Therefore, while this disclosure may refer at times to wellbores and pipelines, it is to be understood that the embodiments of the invention described herein apply equally to both and, for convenience, may sometimes be described only in connection with one or the other. In fact, any oil field tubing or tubular that transports hydrocarbons may benefit from embodiments of the invention.

The well 10 may also be provided with computing equipment 20 which is adapted to optimize corrosion and scaling that can result from production of well fluid. The terms "optimize" and "optimization" refer to the minimization of both corrosion and scaling with respect to fluid produced at the well 10. Computing equipment 20 can perform such optimization using multi-objective optimization that accounts for both corrosion and scaling. In some embodiments, the multi-objective optimization combines Bayesian optimization with either machine learning models or empirical models to optimize scaling and corrosion. This approach allows computing equipment 20 to adjust (or recommend adjusting) production flow rates, alkalinity of the produced fluid, and other scaling and/or corrosion related parameters in a way that minimizes scaling and corrosion in conjunction with one another. Computing equipment 20 can also control various production parameters for the wellsite 10, including the GOR as well as temperatures, pressures, and other parameters for well production known to those having skill in the art.

In the FIG. 1 example, computing equipment 20 may include known components such as computer processors 22, memory 24, one or more software 26 stored thereon, and input/output (I/O) interfaces 28. Software 26 may include production control software as well as a multi-objective corrosion and scaling optimization application 30 as described herein. I/O interfaces 28 allow computing equipment 20 to interface with other computing components (not expressly shown), such as printers, displays, wired and/or wireless networks, and the like. According to known techniques, I/O interfaces 28 also allow computing equipment 20 to operate electronically-controlled valves, pumps, and other production components (not expressly shown) useful to control production at the wellsite 10. Similarly, computing equipment 20 may also be adapted to receive input from instrumentation and measuring devices, like pressure gauges and thermometers, and to record various operating parameters at the wellsite, such as production temperatures, pressures, flow rates, and other measurements. This allows computing equipment 20 to conduct closed-loop control of the well to minimize scaling and corrosion, among other things, according to embodiments described herein.

Corrosion and scaling processes in a pipeline are both highly dependent on the alkalinity of the fluid that flows through the pipeline. Methods known to those skilled in the art for empirically calculating scaling tendency typically involve determining a scaling index SI, or sometimes Is (index of scaling). A useful model for empirically calculating the tendency for the formation of scale can be found, for example, in Oddo, J. E. and Tomson, M. B., "The Prediction of Scale and $CO_2$ Corrosion in Oil Field Systems," Corrosion 99, Paper No. 41:

$$SI_c = \log_{10}\left[\frac{(Ca^{2+})(HCO_3^-)^2}{Py_g f_g}\right] + 6.039 + 1.4463 \times 10^{-2}T - 9.44 \times 10^{-7}T^2 -$$
$$6.185 \times 10^{-5}P - 1.895\ I^{0.5} + 0.662\ I + 3.654 \times 10^{-2}I^{1.5} - 8.00 \times 10^{-7}TI^{0.5}$$

and $$pH = \log_{10}\left[\frac{HCO^-}{Py_g f_g}\right] + 8.569 + 5.520 \times 10^{-3}T - 2.830 \times 10^{-6}T^2 -$$
$$1.330 \times 10^{-5}P - 0.425\ I^{0.5} + 0.346\ I - 1.716 \times 10^{-2}I^{1.5} - 1.298 \times 10^{-3}TI^{0.5}$$

Similarly, a useful empirical model for calculating an anticipated rate of corrosion Vcor is given by:

$$V_{cor} = \frac{1}{\frac{1}{cV_{mass}} + \frac{1}{V_{react}}}$$

$$V_{mass} = 0.023 \frac{D^{0.7}U^{0.8}}{v^{0.5}d^{0.2}}[H_2CO_3]$$

$$c = Re^2 + 2.62 \times 10^6$$

$$\log_{10}(V_{react}) = \left[5.8 - \frac{1710}{273+t} + 0.67\log_{10}(f_g P(B)_{CO_2})\right] \times F_{pH}$$

$$\log_{10}F_{pH} = 0.31(pH_{sat} - pH_{act})$$

$$pH_{sat} = 5.4 - 0.66\log_{10}(f_g P(B)_{CO_2}), \text{ (for pH}_{act}, \text{ see text)}$$

$$\log_{10}v = \frac{1.3272(20-t) - 0.001053(t-20)^2}{(t+105)\rho_f} - 6,$$

(t = Celsius temperature), $$v = 1 \times 10^{-6} v\rho_f(0.0625)\rho_w$$

$$v_{corrected} = \frac{v}{1 \times 10^6 \rho_f}$$

$$D \cong \frac{T(K)}{v} \times 10^{-17},$$

(T(K) = Kelvin temperature), $$[H_2CO_3] = f_g P_{CO_2}(10^{\log_{10}K_H})$$

The variables used in the above equations may be derived from the following commonly known equations:

$$f_g^{CO_2} = \exp\left[p(2.84 \times 10^{-4} - \frac{0.255}{T+460})\right]$$

$$y_g^{CO_2} = y_t^{CO_2}\bigg/\left[1.0 + \frac{\rho f_g^{CO_2}(5.0\ BWPD + 10.0\ BOPD) \times 10^{-5}}{MMscf(T+460)}\right]$$

$$a = 1.0,$$

$$b = K'p_{CO_2} + T_{Ac} - Alk,$$

$$c = K'p_{CO_2}Alk,$$

$$(HCO_3^-) = \frac{-b + (b^2 - 4c)^{1/2}}{2}$$

$$pK' = 3.79 + 6.80 \times 10^{-3}T -$$
$$13.2 \times 10^{-6}T^2 - 3.66 \times 10^{-5}p - 0.097S_i^{1/2} + 0.221S_i \ldots$$

$$p_{CO_2} = p_t y_g^{CO_2} f_g^{CO_2}$$

$$F_{calcite} = 1 - \left(\frac{SI_c + 0.4}{0.8}\right)$$

Following are the variables used in the equations:
Vcor: Corrosion rate (mm/yr)
Vmass: Mass transfer rate
Vreact: Phase boundary reaction rate
Re: Reynolds number
T: Temperature (Celsius)
fg: Fugacity coefficient
P(B)CO2: Partial pressure of CO2 (bars)
Fph: pH correction factor
D: Diffusion coefficient
V: Kinematic viscosity (m2/sec)
U: Liquid flow rate (m/s)
d: Hydraulic diameter
$H_2CO_3$: Total aqueous carbon dioxide and carbonic acid concentration (M)
T(K): Temperature (Kelvin)
pHact: Actual pH of the solution
v: Dynamic viscosity
ρf: Density of the fluids
ρw: Density of the production water
ALK: Alkalinity of production water
PCO2: Partial pressure of CO2

Fcalcite: corrosion correction factor due to calcite

Si, SIc: Scale tendency

These empirical models allow for estimations of the rate of corrosion in the pipeline ("Vcor") and an indication of the tendency for scale to form (which may be referred to in this disclosure sometimes as "Si," "SIc" or "Is"). However, these models, while useful, do not always successfully offer outcomes that reflect actual field results, where scaling and corrosion are affected by numerous real-world parameters that are not accounted for in the above model and may not be accurately measured or understood.

It will be appreciated by those skilled in the art that corrosion and scaling are competing processes. Both are sensitive to the alkalinity of the fluid in the pipeline or wellbore, with the relationship being the higher the pH of the fluid in the wellbore, the more likely the formation of scale and the lower the rate of corrosion, and vice versa.

Figure 2:
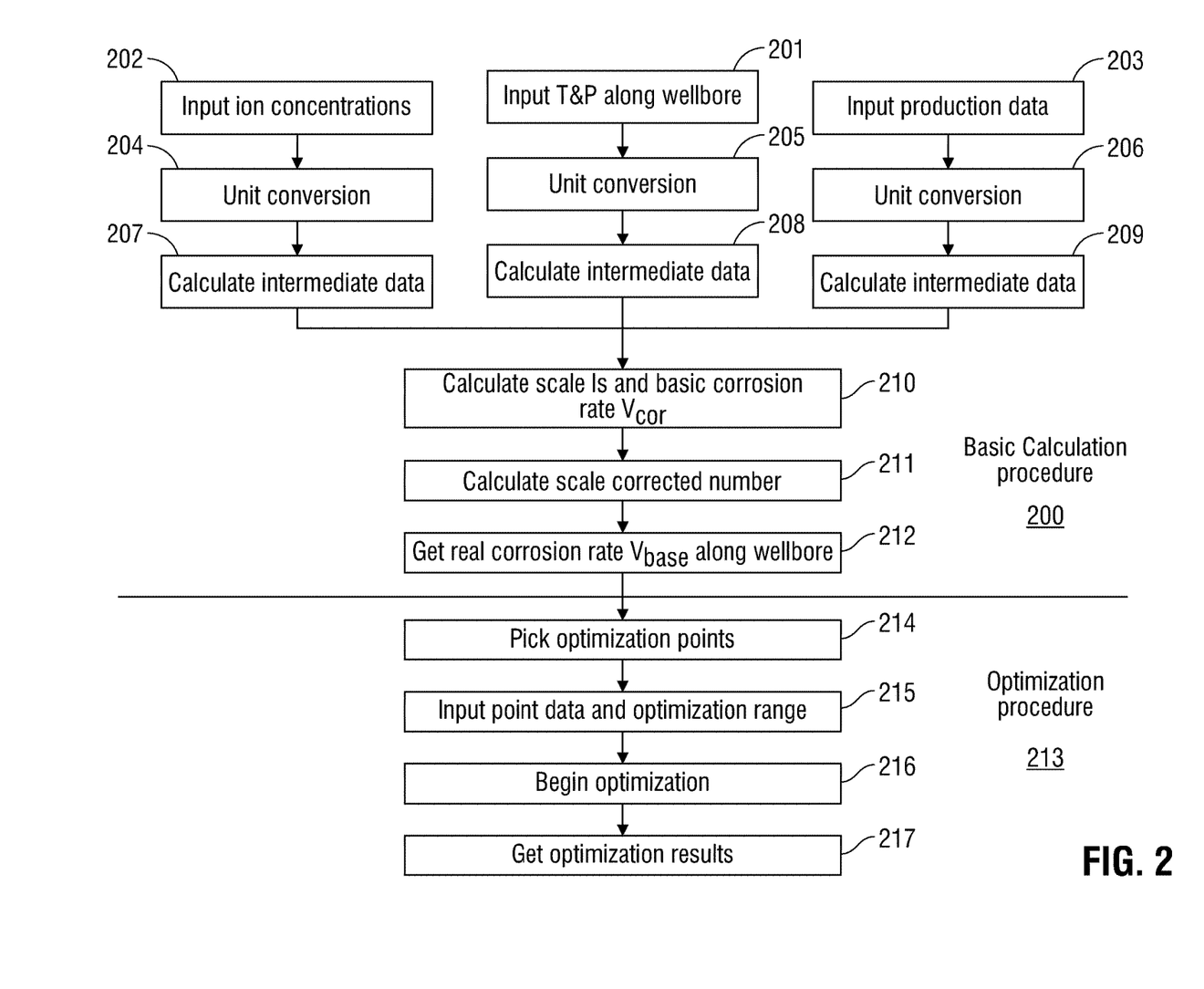
FIG. 2 is a flow chart showing a method for optimizing scaling and corrosion in a wellbore according to embodiments of the present disclosure.

FIG. 2 shows a flow diagram representing a method that may be used with the multi-objective corrosion and scaling optimization application 30 according to embodiments of the invention. The method begins with a basic calculation procedure 200 in which the temperature and pressure (T & P) of the fluid at points along the wellbore is entered into an empirical model at step 201. In the exemplary case of modeling corrosion and scaling in a wellbore, ion concentration may be input into the model at step 202. At step 203, production parameters are input into the model. A table showing the various exemplary input parameters is shown in FIG. 3

Figure 3:
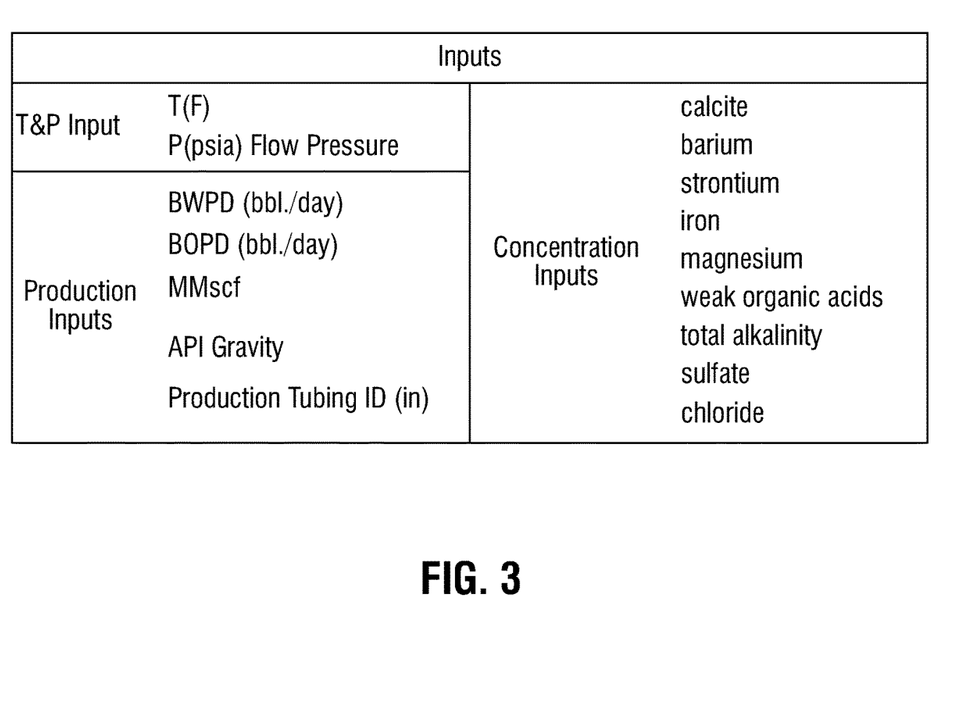
FIG. 3 is a table showing exemplary input categories according to embodiments of the present disclosure.

As shown in FIG. 3, the model input parameters include temperature and pressure (T & P) inputs, production inputs, and ion concentration inputs. The temperature and pressure inputs include, of course, temperature and pressure. The production inputs may include barrels of water per day ("BWPD"), barrels of oil per day ("BOPD"), flow rate (which may be measured in, for example, millions of standard cubic feet (MMscf)), API gravity, the inner diameter of the production tubing, and the like. The concentration inputs may include concentrations (in Moles) of calcite barium strontium, iron, magnesium, weak organic acids, total alkalinity, sulfate, chloride, and the like. All three categories of inputs may be advantageously acquired directly from measurements taken at the well 10.

Referring again to FIG. 2, at steps 204, 205, and 206, unit conversions are performed for each set of inputs respectively. Those skilled in the art will understand that unit conversions refer to the conversion all quantities to consistent units of measure.

At steps 207, 208, and 209, intermediate quantities data is calculated for each of the three input categories. Intermediate quantities are quantities of intermediate components, such as $H_2CO_3$, $PCO_2$, and the like, that are the intermediate variables used in the above equations.

At step 210, the model calculates the scale tendency SI and the basic corrosion rate Vcor. It should be understood that Vcor is the corrosion rate when only corrosion is considered. However, calcite scale deposits are known to reduce or eliminate corrosion. Therefore, at step 211, a correction factor, Fcalcite, is calculated as set out in the equations above to account for calcite scale deposition. In other words, the corrosion rate Vcor and the scale tendency SI are calculated step 210, and the calculated SI is used to calculate the correction factor Fcalcite in step 211.

Figure 4:
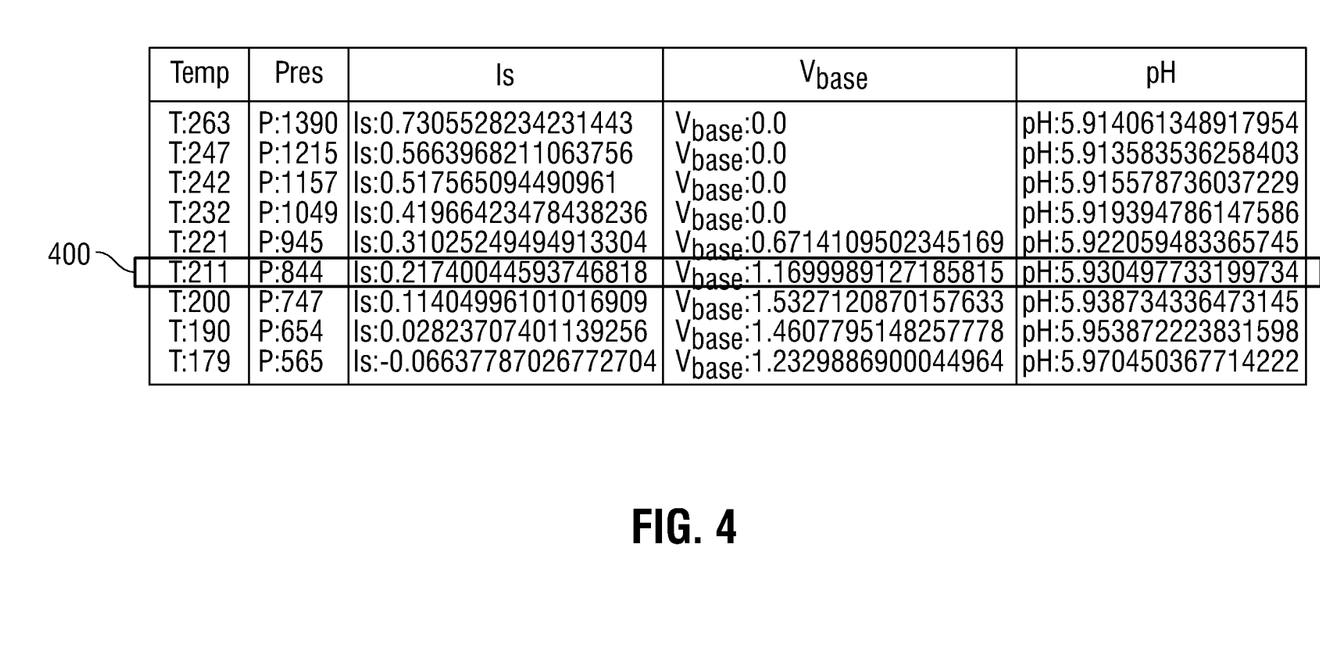
FIG. 4 is a table showing exemplary calculations of wellbore parameters according to embodiments of the present disclosure.

At step 212, a "real" corrosion rate Vbase is calculated at points along the wellbore. Vbase is considered to be the "real" corrosion rate because it takes into account both corrosion and calcite scaling. In some embodiments, this Vbase corrosion rate can be calculated as Vbase=Vcor*Fcalcite. FIG. 4 is a table showing an exemplary series of calculations of Vbase taken from a starting temperature measurement of 179 degrees C. and a pressure of 565 psi to an ending temperature of 263 degrees C. and a pressure of 1390 psi.

In some embodiments, the empirical model described with respect to steps 201-212 may be replaced by a machine learning model that determines the real corrosion rate Vbase. An exemplary machine learning model useful in embodiments of the invention is a Deep Neural Network ("DNN"). Various suitable DNNs are known to those of skill in the art. DNNs may be advantageous in embodiments of the invention because they may be derived from actual field data acquired from wells in the same geographical region. Given sufficient data to adequately train the model, a DNN may provide better accuracy than empirical models that were developed based on laboratory experiments or data from geographically different wells. A Deep Neural Network may be useful to build scale and corrosion models directly from the acquired field data rather using empirical models. The DNN model can then be further used for optimization.

After the basic calculation procedure 200 using either an empirical approach or a machine learning approach is performed and input parameters, such as those shown in the table of FIG. 3, have been obtained, an optimization procedure 213 may be performed by the multi-objective corrosion and scaling optimization application 30.

Optimization begins at step 214 where optimization points are chosen from calculations performed during the basic calculation procedure 200. The optimization minimizes Is and Vbase and is performed after choosing a particular depth, temperature and/or pressure. The choice of depth, temperature and/or pressure at which Is and Vbase are minimized is a matter of design choice and may be determined based on the parameters advantageous for a particular well or geology. For example, an optimization point may be selected based on the depth where the maximum amount of corrosion or scaling occurs. To illustrate, using the example parameter calculations obtained as shown in FIG. 4, an optimization point 400 is chosen at the temperature of 211 degrees C. and pressure of 844 psi.

The optimization points are input at step 215 by providing the optimization points to a multi-objective optimization model. According to embodiments of the invention, the corrosion and scaling optimization application 30 uses a true multi-objective optimization model, as distinguished from single objective optimization models, such as "Bayesopt," which is an open source optimization algorithm known to those of skill in the art. A true multi-objective optimization model is preferred because it optimizes conflicting objectives, i.e., minimizing both corrosion and scaling, whereas models like Bayesopt optimize one or the other. In some embodiments, the multi-objective optimization model may use alkalinity and production inputs as the optimization parameters. This allows the model to predict the alkalinity and production inputs that will minimize both scaling and corrosion rate.

At step 216, a multi-objective Bayesian optimization is performed on Vbase and Is. As noted above, minimizing Vbase and Is are conflicting objectives. Therefore, in one embodiment, optimization may be performed separately on each individual objective. In another embodiment, the sum of Is and Vbase may be optimized, with Is and Vbase being equally weighted. The results of both optimization techniques may then be compared with one another to determine the optimal solution for setting well parameters, such as production flow rate, GOR and alkalinity in the production fluids.

A useful model for performing this multi-objective Bayesian optimization is GPflopt, which is also an open source optimization algorithm familiar to those skilled in the art. Multi-objective Bayesian optimization algorithms like GPflopt are advantageous in embodiments of the invention because they are computationally fast and can quickly converge on solutions and thus suitable for real-time applications at a wellsite. Further, such algorithms are unlikely to fail to converge on solutions by, for instance, getting stuck in local minima. Even so, other multi-objective optimization techniques may be used as a matter of design choice, such as LIMBO, which is another example of suitable open source software useful in embodiments of the invention.

Multi-objective optimization will yield a range of values for Is and Vbase and for corresponding well parameters such as BWPD, BOPD, alkalinity and GOR. Thus, at step 217, a specific solution may be chosen from these optimized solutions and actions may be taken to modify production conditions. For example, the production may be either increased or reduced as necessary to achieve the calculated production rate. Also, the water injected in to the formation for secondary recovery may be treated to alter the alkalinity of the production fluids at the wellsite. Still further actions, such as the addition of chemicals, which will be familiar to those skilled in the art to alter the alkalinity at the wellhead or in the pipeline. Selecting the operating parameters based on the optimized results is a matter of design choice. For instance, some optimized solutions may have commercially unacceptable rates of production or may require changes to alkalinity that are unfeasible for various reasons.

To illustrate, again referring to the specific example of parameters determined in FIG. 4, after running GPflopt, one specific set of solution parameters yields a Vbase of 0.26044776, an Is of 0.35759227, an optimum alkalinity of 470 meq/L (milliequivalents per liter), and an optimum production amount of 287.3 barrels of water per day. The well may be operated in a closed loop fashion to maintain production at this alkalinity (e.g., by adjusting pH) and production with a high degree of confidence that this simultaneously minimizes scaling and corrosion in the wellbore while also achieving commercially acceptable production rates.

Accordingly, as set forth above, embodiments of the present disclosure may be implemented in a number of ways. In general, in one aspect, embodiments of the present disclosure relate to a method for optimizing scaling and corrosion in an oil field tubular. The method comprises, among other things, obtaining a set of input parameters related to a fluid flowing in the oil field tubular and performing a base calculation procedure to determine a corrosion rate ("Vbase") and a scaling index ("Is") reflecting a tendency of scale to form in the oil field tubular based on the set of input parameters, wherein the base calculation procedure yields a range of values for Vbase and Is along the oil field tubular. The method also comprises selecting optimization points from the ranges of Vbase and Is obtained from the base calculation, and performing a multi-objective optimization for the selected optimization points of Vbase and Is. The method further comprises controlling an alkalinity and flow rate of the fluid based on the multi-objective optimization.

In accordance with any one or more of the foregoing embodiments, the step of obtaining a set of input parameters comprises obtaining the temperature and pressure of the fluid in the oil field tubular, and the step of obtaining a set of input parameters comprises obtaining the ion concentrations present in the fluid, wherein the oil field tubular comprises one or more of a production tubing in a wellbore and a section of pipe in a pipeline.

In accordance with any one or more of the foregoing embodiments, the step of obtaining a set of input parameters comprises: obtaining a temperature and pressure of the fluid in the oil field tubular; obtaining a BWPD, BOPD, flow rate, API gravity, and production tubing inner diameter of the wellbore; and obtaining ion concentrations of at least one of calcite, barium, strontium, iron, magnesium, weak organic acids, total alkalinity, sulfate, or chloride.

In accordance with any one or more of the foregoing embodiments, the step of performing a base calculation comprises using an empirical model to determine Vbase and Is, or using machine learning to determine Vbase and Is, wherein the step of using machine learning comprises using a Deep Neural Network.

In general, in another aspect, embodiments of the present disclosure relate to a system for optimizing scaling and corrosion in an oil field tubular. The system comprises, among other things, a processor and a memory unit storing computer-readable instructions. The computer-readable instructions, when executed by the processor, cause the system to obtain a set of input parameters related to fluid flowing in the oil field tubular and perform a base calculation procedure to determine a corrosion rate ("Vbase") and a scaling index ("Is") reflecting a tendency of scale to form in the oil field tubular based on the set of input parameters, wherein the base calculation procedure yields a range of values for Vbase and Is along the oil field tubular. The computer-readable instructions also cause the system to select optimization points from the ranges of Vbase and Is obtained from the base calculation, and perform a multi-objective optimization for the selected optimization points of Vbase and Is. The computer-readable instructions further cause the system to control an alkalinity and flow rate of the fluid based on the multi-objective optimization.

In accordance with any one or more of the foregoing embodiments, the set of input parameters comprises temperature and pressure of the fluid in the oil field tubular, and the set of input parameters comprises ion concentrations present in the fluid, wherein the oil field tubular comprises one or more of a production tubing in a wellbore and a section of pipe in a pipeline.

In accordance with any one or more of the foregoing embodiments, the computer-readable instructions cause the system to obtain the input parameters by obtaining a temperature and pressure of the fluid in the oil field tubular; obtaining a BWPD, BOPD, flow rate, API gravity, and production tubing inner diameter of the wellbore; and obtaining ion concentrations of at least one of calcite, barium, strontium, iron, magnesium, weak organic acids, total alkalinity, sulfate, or chloride.

In accordance with any one or more of the foregoing embodiments, the computer-readable instructions cause the system to perform the base calculation using an empirical model to determine Vbase and Is, or using machine learning to determine Vbase and Is, wherein the computer-readable instructions cause the system to use machine learning by using a Deep Neural Network.

In general, in yet another aspect, embodiments of the present disclosure relate to a system for operating an oil and gas well to minimize scaling and corrosion. The system comprises instrumentation located about a wellbore of the oil and gas well for measuring temperature, pressure, at least one production parameter and at least one ion concentration of a fluid in the wellbore. The system further comprises a processor for performing a base calculation procedure to determine a corrosion rate ("Vbase") and a scaling index ("Is") reflecting a tendency of scale to form in the wellbore based on the measurements provided by the instrumentation, wherein Vbase and Is are calculated along the length of the wellbore. Based on a selected set of optimization points taken from the calculations of Vbase and Is, the processor is adapted to perform a multi-objective optimization for the selected optimization points of Vbase and Is and control an alkalinity and flow rate of the fluid based on the multi-objective optimization.

In accordance with any one or more of the foregoing embodiments, the processor performs the base calculation procedure using a Deep Neural Network, and the processor performs the multi-objective optimization using Bayesian optimization.

In accordance with any one or more of the foregoing embodiments, the processor is adapted to control, based on the Bayesian optimization, one or more of temperature and pressure of the fluid in the wellbore; a BWPD, BOPD, flow rate, API gravity, and production tubing inner diameter of the wellbore; and ion concentrations of at least one of calcite, barium, strontium, iron, magnesium, weak organic acids, total alkalinity, sulfate, or chloride.

In general, in still another aspect, embodiments of the present disclosure relate to a computer-readable medium. The computer-readable medium stores computer-readable instructions for causing computing equipment to perform a method according to any one or more of the foregoing embodiments.

While the disclosure has been described with reference to one or more particular embodiments, those skilled in the art will recognize that many changes may be made thereto without departing from the spirit and scope of the description. Each of these embodiments and obvious variations thereof is contemplated as falling within the spirit and scope of the claimed disclosure, which is set forth in the following claims.

What is claimed is:

1. A method for optimizing scaling and corrosion in an oil field tubular, comprising:
   obtaining a set of input parameters related to a fluid flowing in the oil field tubular;
   performing a base calculation procedure to determine a corrosion rate and a scaling index reflecting a tendency of scale to form in the oil field tubular based on the set of input parameters, wherein the base calculation procedure yields a range of values for the corrosion rate and the scaling index along the oil field tubular;
   selecting optimization points from the ranges of the corrosion rate and the scaling index obtained from the base calculation procedure, wherein the optimization points are selected at particular depths along the oil field tubular, and wherein at least one of the selected optimization points is selected at a depth that has a maximum value for the corrosion rate or the scaling index;
   performing a multi-objective optimization for the selected optimization points of the corrosion rate and the scaling index; and
   controlling an alkalinity and flow rate of the fluid based on the multi-objective optimization.

2. The method of claim 1, wherein the step of obtaining the set of input parameters comprises obtaining a temperature and pressure of the fluid in the oil field tubular.

3. The method of claim 1, wherein the step of obtaining the set of input parameters comprises obtaining an ion concentration present in the fluid.

4. The method of claim 1, wherein the oil field tubular comprises one or more of a production tubing in a wellbore and a section of pipe in a pipeline.

5. The method of claim 4, wherein the step of obtaining the set of input parameters comprises:
   obtaining a temperature and pressure of the fluid in the oil field tubular;
   obtaining a BWPD, BOPD, flow rate, API gravity, and production tubing inner diameter of the wellbore; and
   obtaining ion concentrations of at least one of calcite, barium, strontium, iron, magnesium, weak organic acids, total alkalinity, sulfate, or chloride.

6. The method of claim 1, wherein the step of performing the base calculation procedure comprises using an empirical model to determine the corrosion rate and the scaling index.

7. The method of claim 1, wherein the step of performing the base calculation procedure comprises using machine learning to determine the corrosion rate and the scaling index.

8. The method of claim 7, wherein the step of using machine learning comprises using a Deep Neural Network.

9. A system for optimizing scaling and corrosion in an oil field tubular, comprising:
   a processor; and
   a memory unit storing computer-readable instructions that, when executed by the processor, causes the system to,
   obtain a set of input parameters related to fluid flowing in the oil field tubular;
   perform a base calculation procedure to determine a corrosion rate and a scaling index reflecting a tendency of scale to form in the oil field tubular based on the set of input parameters, wherein the base calculation procedure yields a range of values for the corrosion rate and the scaling index along the oil field tubular;
   select optimization points from the ranges of the corrosion rate and the scaling index obtained from the base calculation procedure, wherein the optimization points are selected at particular depths along the oil field tubular, and wherein at least one of the selected optimization points is selected at a depth that has a maximum value for the corrosion rate or the scaling index;
   perform a multi-objective optimization for the selected optimization points of the corrosion rate and the scaling index; and
   control an alkalinity and flow rate of the fluid based on the multi-objective optimization.

10. The system of claim 9, wherein the set of input parameters comprises temperature and pressure of the fluid in the oil field tubular.

11. The system of claim 9, wherein the set of input parameters comprises ion concentrations present in the fluid.

12. The system of claim 9, wherein the oil field tubular comprises one or more of a production tubing in a wellbore and a section of pipe in a pipeline.

13. The system of claim 12, wherein the computer-readable instructions cause the system to obtain the set of input parameters by:
   obtaining a temperature and pressure of the fluid in the oil field tubular;
   obtaining a BWPD, BOPD, flow rate, API gravity, and production tubing inner diameter of the wellbore; and obtaining ion concentrations of at least one of calcite, barium, strontium, iron, magnesium, weak organic acids, total alkalinity, sulfate, or chloride.

14. The system of claim 9, wherein the computer-readable instructions cause the system to perform the base calculation procedure using an empirical model to determine the corrosion rate and the scaling index.

15. The system of claim 9, wherein the computer-readable instructions cause the system to perform the base calculation procedure using machine learning to determine the corrosion rate and the scaling index.

16. The system of claim 15, wherein the computer-readable instructions cause the system to use machine learning by using a Deep Neural Network.

17. A system for operating an oil and gas well to minimize scaling and corrosion, comprising:
   instrumentation located about a wellbore of the oil and gas well for measuring temperature, pressure, at least one production parameter and at least one ion concentration of a fluid in the wellbore; and
   a processor for performing a base calculation procedure to determine a corrosion rate and a scaling index reflecting a tendency of scale to form in the wellbore based on the measurements provided by the instrumentation, wherein the corrosion rate and the scaling index are calculated along a length of the wellbore,
   wherein, based on a selected set of optimization points taken from the calculations of the corrosion rate and the scaling index that are selected at particular depths along the wellbore, wherein at least one of the selected optimization points is selected at a depth that has a maximum value for the corrosion rate or the scaling index, the processor is adapted to perform a multi-objective optimization for the selected optimization points of the corrosion rate and the scaling index and control an alkalinity and flow rate of the fluid based on the multi-objective optimization.

18. The system of claim 17, wherein the processor performs the base calculation procedure using a Deep Neural Network.

19. The system of claim 17, wherein the processor performs the multi-objective optimization using Bayesian optimization.

20. The system of claim 19, wherein the processor is adapted to control, based on the Bayesian optimization, one or more of:
   temperature and pressure of the fluid in the wellbore;
   a BWPD, BOPD, flow rate, API gravity, and production tubing inner diameter of the wellbore; and
   ion concentrations of at least one of calcite, barium, strontium, iron, magnesium, weak organic acids, total alkalinity, sulfate, or chloride.

* * * * *